United States Patent
Favaretto et al.

(10) Patent No.: US 9,006,920 B2
(45) Date of Patent: Apr. 14, 2015

(54) ELECTRICAL SYSTEM OF A VEHICLE WITH ELECTRIC PROPULSION AND CONTROL METHOD THEREOF

(75) Inventors: Fabrizio Favaretto, Formigine (IT); Giovanni Stefani, Cadiroggio (IT)

(73) Assignee: Ferrari S.p.A., Modena (IT)

( * ) Notice: Subject to any disclaimer, the term of this patent is extended or adjusted under 35 U.S.C. 154(b) by 596 days.

(21) Appl. No.: 13/081,697

(22) Filed: Apr. 7, 2011

(65) Prior Publication Data

US 2012/0001480 A1    Jan. 5, 2012

(30) Foreign Application Priority Data

Apr. 7, 2010 (IT) .................. BO2010A0209

(51) Int. Cl.
*B60L 1/00* (2006.01)
*B60L 3/00* (2006.01)
*H02G 3/00* (2006.01)
(Continued)

(52) U.S. Cl.
CPC .............. *H02J 7/0016* (2013.01); *B60K 6/48* (2013.01); *B60L 3/0046* (2013.01); *B60L 3/04* (2013.01); *B60L 11/005* (2013.01); *B60L 11/14* (2013.01); *B60L 11/1866* (2013.01); *B60L 15/007* (2013.01); *H02J 7/0054* (2013.01); *H02J 7/1423* (2013.01); *Y02T 10/6221* (2013.01); *Y02T 10/7005* (2013.01); *Y02T 10/7022* (2013.01);
(Continued)

(58) Field of Classification Search
CPC ......... B60K 6/48; B60L 11/005; B60L 11/14; B60L 11/1866; B60L 15/007; B60L 3/0046; B60L 3/04; H02J 7/0016; H02J 7/0054; H02J 7/1423; Y02T 10/6621; Y02T 10/7005; Y02T 10/7022; Y02T 10/7055; Y02T 10/7061; Y02T 10/7077
See application file for complete search history.

(56) References Cited

U.S. PATENT DOCUMENTS 8,222,866 B2 * 7/2012 Sugimoto et al. ............. 320/128
2008/0190674 A1   8/2008 Nakanishi
(Continued)

FOREIGN PATENT DOCUMENTS

| EP | 2056422 | 5/2009 |
|---|---|---|
| EP | 2157657 | 2/2010 |
| JP | 2003189490 | 7/2003 |

OTHER PUBLICATIONS

Search Report for Italian Application Serial No. BO20100209, Ministero dello Sviluppo Economico, Munich, Feb. 21, 2011, pp. 2.

*Primary Examiner* — Jared Fureman
*Assistant Examiner* — Aqeel Bukhari
(74) *Attorney, Agent, or Firm* — Lane Powell PC; Bryan A. Santarelli

(57) ABSTRACT

An embodiment of an electrical system of a vehicle with electric propulsion achieved by at least one electrical machine; the electrical system has: a storage section provided with at least one battery including of a plurality of cells, each of which is coupled in series with the other cells and is provided with a bypass branch that is coupled in parallel to the cell and has a bypass switch; a section of traction that interacts with the electric machine and is equipped with a power electronic converter that exchanges electrical energy with the storage section; and a section of the auxiliaries, which powers auxiliary services of the vehicle, has a buffer battery and is electrically powered by the storage section; a first connector switch coupling the storage section to the section of traction; and a second connector switch coupling the storage section to the section of the auxiliaries.

10 Claims, 3 Drawing Sheets

(51) Int. Cl.
*B60K 8/00* (2006.01)
*B60K 6/20* (2007.10)
*H02J 7/00* (2006.01)
*B60K 6/48* (2007.10)
*B60L 3/04* (2006.01)
*B60L 11/00* (2006.01)
*B60L 11/14* (2006.01)
*B60L 11/18* (2006.01)
*B60L 15/00* (2006.01)
*H02J 7/14* (2006.01)

(52) U.S. Cl.
CPC .......... *Y02T 10/7055* (2013.01); *Y02T 10/7061* (2013.01); *Y02T 10/7077* (2013.01)

(56) References Cited

U.S. PATENT DOCUMENTS

2009/0001926 A1* 1/2009 Sato ............................ 320/102
2009/0091294 A1* 4/2009 Gong et al. ................... 320/122
2010/0065349 A1* 3/2010 Ichikawa et al. ............. 180/65.1

* cited by examiner

ELECTRICAL SYSTEM OF A VEHICLE WITH ELECTRIC PROPULSION AND CONTROL METHOD THEREOF

PRIORITY CLAIM

The instant application claims priority to Italian Patent Application No. BO2010A000209, filed Apr. 7, 2010, which application is incorporated herein by reference in its entirety.

TECHNICAL FIELD

An embodiment relates to an electrical system of a vehicle with electric propulsion and to a control method thereof.

An embodiment is advantageously applied to a road vehicle with hybrid propulsion, to which explicit reference will be made in the following description without therefore loosing in generality.

BACKGROUND

A hybrid vehicle includes an internal combustion thermal engine, which transmits torque to the driving wheels by means of a transmission provided with a gearbox coupled to a clutch, and at least one electric machine, which is electrically coupled to an electric storage system and mechanically coupled to the driving wheels.

The electrical power system of a hybrid vehicle includes a storage section, which is provided with at least one main automotive battery including a plurality of electrochemical cells which are coupled in series so that the voltage of the single cells is summed; the storage section works at an average voltage in the order of 200 Volts nominal. Furthermore, the electrical power system of a hybrid vehicle includes a section of traction which interacts with the electric machine and works at high voltage, in the order of 600-700 Volts nominal; the section of traction is coupled to the storage section by means of a two-way power electronic converter (i.e. that is either capable of absorbing electrical power from the storage section for powering the electric machine working as motor or capable of providing the electrical power generated by the electric machine working as generator to the storage section). Finally, the electrical power system of a hybrid vehicle includes a section of auxiliaries which powers all the auxiliary services of the vehicle requiring an electric supply and works at low voltage equal to 12 Volts nominal; the section of auxiliaries includes a buffer battery having a modest storage capacity (if compared to the main battery of the storage section) and is coupled to the storage section by means of a one-way power electronic converter which has the function of lowering the nominal voltage supplied by the storage section (200 Volts) to the nominal voltage (12 Volts) of the section of auxiliaries. In other words, the power electronic converter of the section of auxiliaries absorbs electrical power from the storage section at the power of 200 Volts for powering the auxiliary services and/or for recharging the buffer battery with a voltage of 12 Volts.

In modern hybrid vehicles, there are many auxiliary services which require electrical power and may absorb up to an overall high electrical power; consequently, the power electronic converter must be capable of providing a high electrical power (higher, even greatly, than 1000 Watts). However, a power electronic converter capable of providing high electrical power may be cumbersome and thus determines a non-negligible increase of total weight of the vehicle (currently, the tendency is to make the road vehicle as light as possible to reduce the energy consumption needed to move the road vehicle itself).

Patent application EP2056422A1, which is incorporated by reference, describes a discharge control system of a battery including a plurality of cells, each of which is coupled in series to the other cells and is provided with a bypass branch which is coupled in parallel to the cell and has an electronically controlled bypass switch. The bypass switches are controlled (i.e. opened and closed) to obtain a "balanced" discharge of the cells so as to exploit in greater measure the cells having higher electric charge (consequently a higher voltage at their terminals).

SUMMARY

An embodiment is an electrical system of a vehicle with electric propulsion and control method thereof, which electrical system and control method are free from the drawbacks described above and are at the same time easy and cost-effective to make.

BRIEF DESCRIPTION OF THE DRAWINGS

One or more embodiments will now be described with reference to the accompanying drawings, which illustrate a non-limitative embodiment thereof, in which.

DETAILED DESCRIPTION

Figure 1:
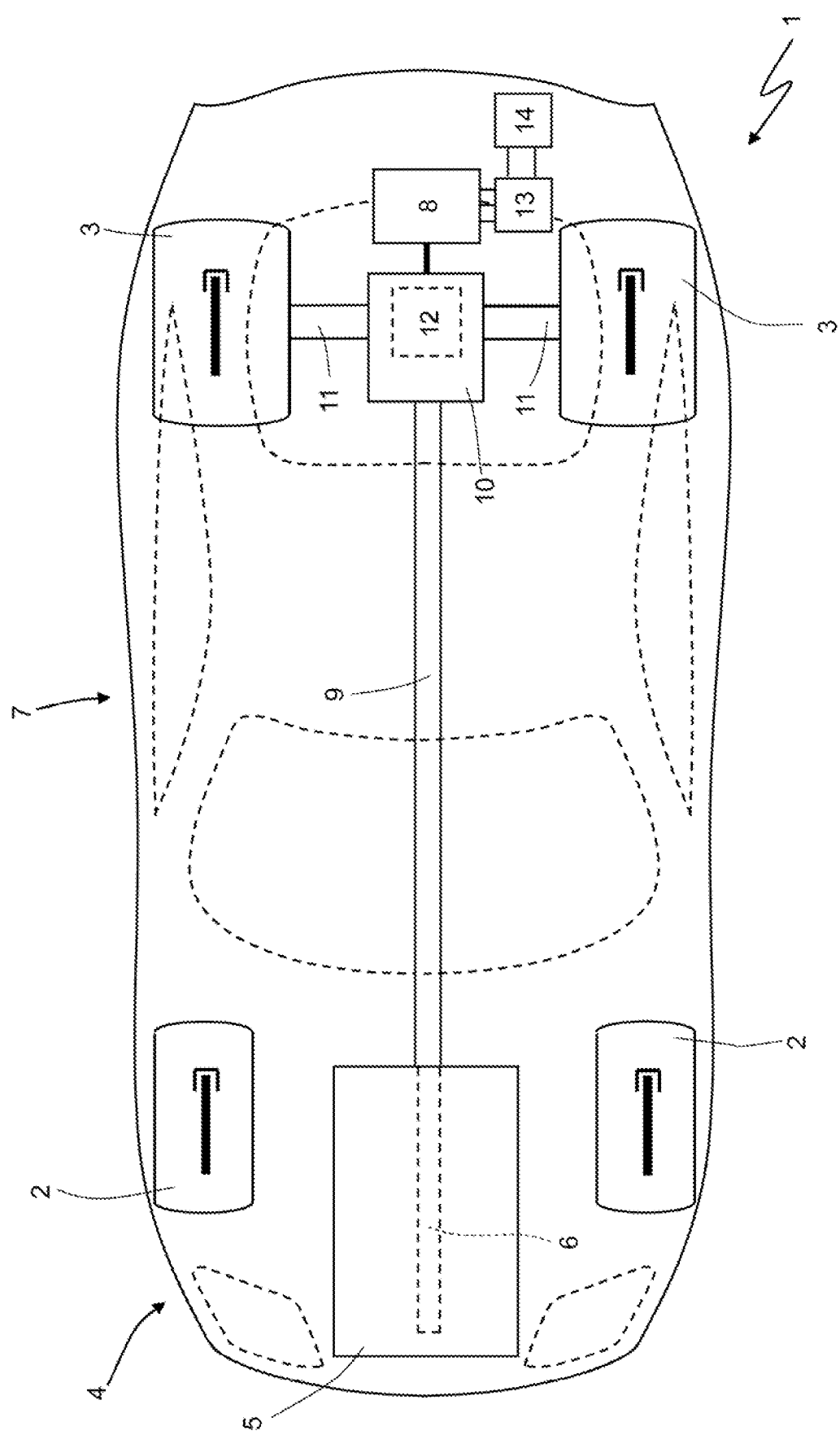
FIG. 1 is a diagrammatic view of a road vehicle with hybrid propulsion.

In FIG. 1, numeral 1 indicates as a whole an embodiment of a road vehicle with hybrid propulsion provided with two front wheels 2 and two rear drive wheels 3, which receive torque from a hybrid propulsion system 4.

The hybrid propulsion system 4 includes an internal combustion engine 5, which is arranged in frontal position and is provided with a drive shaft 6, an automatic manual transmission 7 (commonly named "AMT"), which transmits the torque generated by the internal combustion engine 5 to the rear drive wheels 3, and a reversible electric machine 8 (i.e. an electric machine which can work either as electric motor, using electricity and generating mechanical torque, or as electric generator, using mechanical energy and generating electrical energy), which is mechanically coupled to the transmission 7.

Transmission 7 includes a transmission shaft 9, which, at one end, is angularly integral with the drive shaft 6, and at the other end is mechanically coupled to a twin-clutch gearbox 10, which is arranged in rear position and transmits motion to the rear drive wheels 3 by means of two axles shafts 11, which receive motion from a differential 12. The reversible electric machine 8 is mechanically coupled to the twin-clutch gearbox 10, and is driven by an power electronic converter 13 coupled to an electric storage system 14, which is adapted to store electrical energy, and is provided with chemical batteries and/or supercapacitors. The chemical batteries have the advantage of providing a high amount of energy but the disadvantage of not being capable of delivering very high electrical power and thus allow the vehicle 1 to cover long distances in electric mode (high autonomy), but do not allow the vehicle 1 to reach high dynamic performance in electric mode; on the contrary, the supercapacitors display the advantage of being able to deliver a very high electrical power but on the contrary are not capable of providing a large amount of energy and thus allow the vehicle 1 to reach high dynamic performance in electric mode, but do not allow the vehicle 1 to cover considerable distances in electric mode. The proportion between chemical batteries and supercapacitors in the storage system 14 is chosen during the step of designing according to the desired ratio between autonomy and performance in electric mode.

Reference to patent IT2009BO00752, which is incorporated by reference, is made for the coupling methods of the reversible electric machine 8 to the twin-clutch transmission 10.

Figure 2:
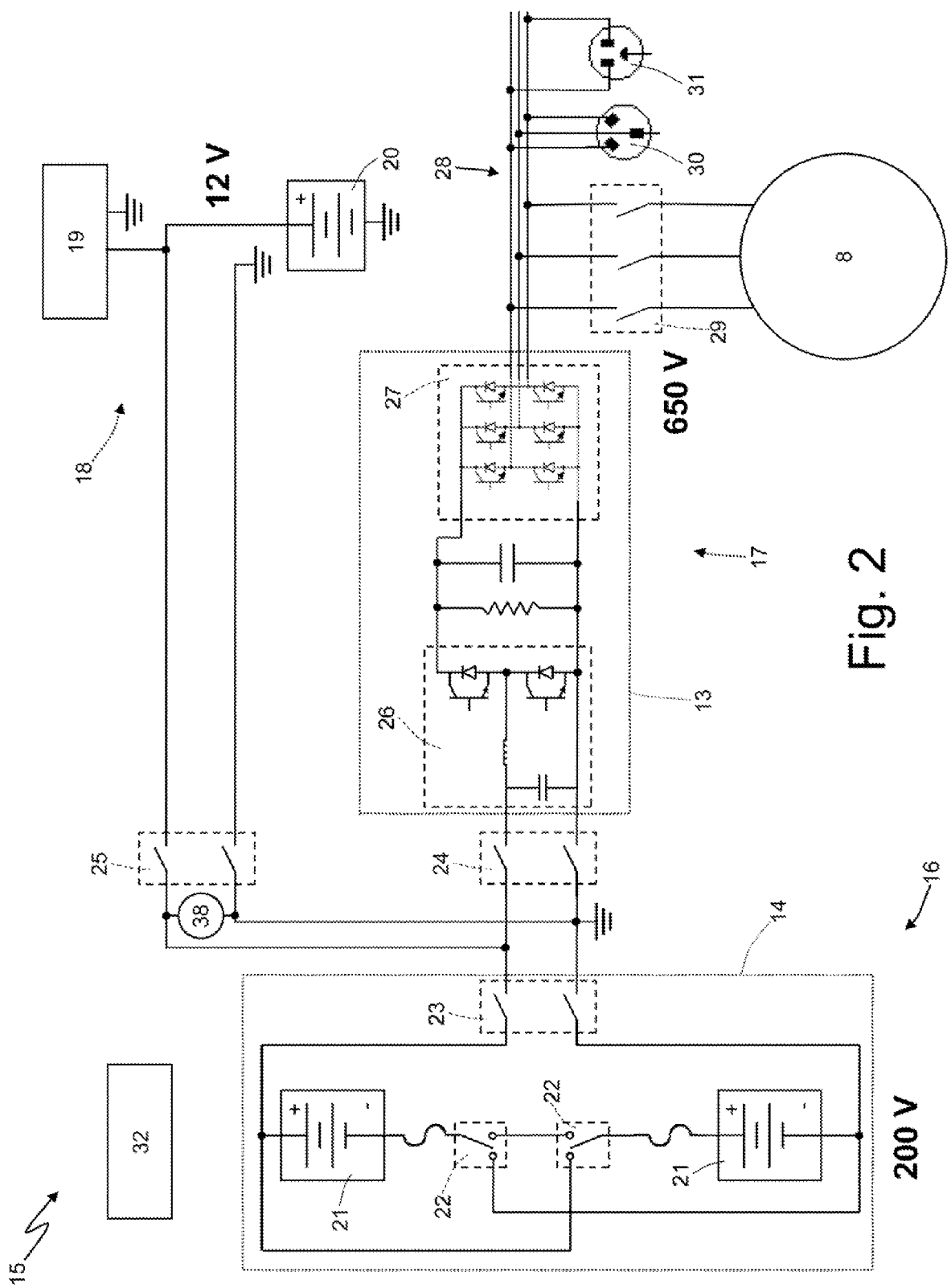
FIG. 2 is a view of an electrical power system of the road vehicle in FIG. 1, made in accordance with an embodiment.

As shown in FIG. 2, the vehicle 1 is provided with an electrical power system 15 including a storage section 16, which includes the storage system 14 and works at average voltage equal to 200 Volts nominal. Furthermore, the electrical power system 15 of the vehicle 1 includes a section of traction 17 which interacts with the electric machine 8 and works at high voltage equal to 650 Volts nominal; the section of traction 17 is coupled to the storage section 16 by means of a two-way power electronic converter 13 (i.e. that is capable of absorbing electrical power from the storage section for powering the electric machine working as motor or is capable of providing to the storage section the electrical power generated by the electric machine working as generator). Finally, the electrical system 15 of the vehicle 1 includes a section of auxiliaries 18 which supplies all the auxiliary services 19 (diagrammatically shown) of the vehicle 1 requiring an electric supply and works at low voltage equal to 12 Volts nominal; the section of auxiliaries 18 includes a buffer battery 20 having a modest storage capacity (when compared to that of the storage system 14) and is electrically powered by the storage section 16 according to the methods described hereinafter for powering the auxiliary services 19 and/or for recharging the buffer battery 20.

The buffer system 14 includes two reciprocally independent twin batteries 21 which are coupled to one another in series. Furthermore, the storage system 14 includes, for each battery 21, a respective electronic or electromechanical bypass switch 22, which is coupled in parallel to the battery 21 to form a bypass of the battery 21; in case of failure to a battery 21, the battery 21 itself is cut off by closing the respective bypass switch 22 and the storage system 14 continues to work with the other battery 22 only. Furthermore, the storage system 14 includes an electronic or electromechanical separation switch 23 (which is also shaped as an electric disconnector) having, among other, the function of guaranteeing that the electrical system 15 of the vehicle 1 is free from voltage when a service intervention is required.

The storage section 16 is coupled to the section of traction 17 by means of an electronic or electromechanical connector switch 24 and is coupled to section 18 of the auxiliary devices by means of an electronic or electromechanical connector switch 25.

The power electronic converter 13 is provided with a two-way DC-DC converter of the "Buck-Boost" type, which has the function of modifying the voltage to electrically couple the storage system 14, which works at medium voltage (typically 200 Volts when both batteries 21 are working), to the power electronic converter 13, which works at high voltage (typically 650 Volts). Furthermore, the power electronic converter 13 includes a three-phase inverter 27, which on direct current side is coupled to the two-way converter 26 and on alternating current side is coupled to the three-phase bars 28. Between the converter 26 and the inverter 27 are coupled in parallel a capacitor, having the function of reducing the oscillations of the voltage, and a (high value) resistor, having the function of discharging the capacitor when the circuit is not used to prevent voltage dangerous for technicians carrying out maintenance/repair operations from remaining in the circuit for a long time.

The electric machine 8 is coupled to the three-phase bars 28 by means of an electronic or electromechanical three-phase switch 29. Furthermore, the three-phase bars 28 are coupled to a three-phase connector 30 (i.e. provided with three terminals coupled to the three three-phase bars 28, respectively) and a one-phase connector 31 (i.e. provided with two terminals coupled to one two of the three three-phase bars 28, respectively).

A control unit 32 is contemplated which has the function of superintending the operation of all components of the electrical power system 15 of vehicle 1, controlling the bypass switches 22, controlling the separation switches 23 and 29, controlling the connector switches 24 and 25, driving the converter 26, and driving the inverter 27.

Normally, both batteries 21 are active and reciprocally coupled in series to output a voltage of 200 Volts from the storage system 14 (each battery 21 has a voltage of 100 Volts at its terminals). In case of fault in a battery 21, the battery 21 itself is excluded by closing the respective bypass switch 22 and the storage system 14 continues to work only with the other battery 21; thus a halved voltage with respect to the nominal value (100 Volts instead of 200 Volts) is provided at the output of the storage system 14 and such halving of the voltage is compensated by appropriately driving the converter 26 so that a nominal voltage equal to 650 Volts is always present at converter output 26.

When vehicle 1 is running, the separation switch 29 is closed so that the inverter 27 can drive the electric machine 8 either as motor or as generator.

When the vehicle 1 is stationary, the separation switch 29 is opened and the storage system 14 can be recharged by coupling the three-phase bars 28 to the electric mains either by means of the three-phase connector 30 or by means of a one-phase connector 31; all three branches of the inverter 27 are active when the three-phase connector 30 is used, while only two of the three branches of the inverter 27 are active when the one-phase connector 31 is used. While recharging from the electric mains, the inverter 27 and the converter 26 are driven so that the input alternating voltage of the mains (normally 220 V between phase and ground and 380 Volts between two phases) is transformed into direct 200 Volts at the terminals of the storage system 14 (100 Volts, if one of the two batteries 21 has been cut off by means of the respective bypass switch 22).

Figure 3:
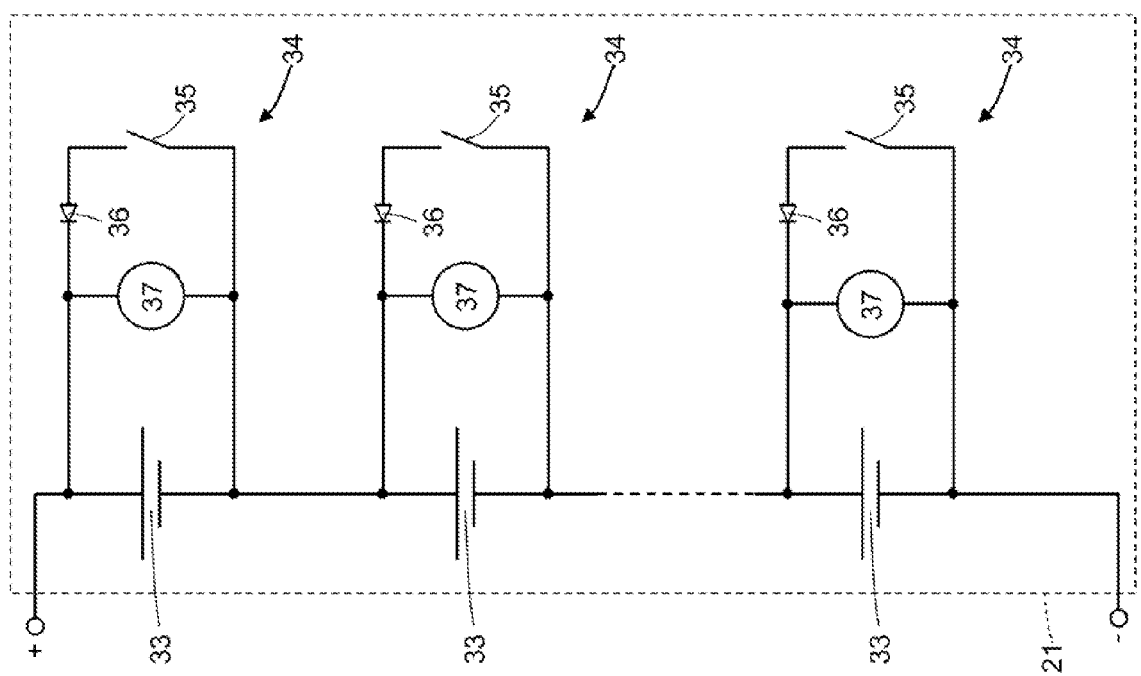
FIG. 3 is a diagrammatic view of a battery including a plurality of cells coupled in series to the electrical power system in FIG. 2.

As shown in FIG. 3, each battery 21 includes a plurality of electrochemical cells 33 (only a small part of which is shown in FIG. 1), which are used to convert storage chemical energy into electrical energy and vice versa and coupled in series so that the voltage of the single cells is summed. In other words, by coupling the cells 33 in series to the terminals of the battery 21*a* sufficiently high electric voltage is present so as to allow the battery 21 to deliver considerable electrical power, while maintaining the intensity of the electric current within non excessive values. In the embodiment shown in the accompanying figures, the battery 21 has at its terminals a nominal voltage of 100 Volts and includes twenty-five cells, which are coupled to one another in series and each have a nominal voltage of 4 Volts.

In parallel to each cell 33 is arranged a bypass branch 34, which includes an electronic or electromechanical bypass switch 35 coupled in series to a diode 36 and has the function of excluding the cell 33 from the electrical current which crosses the battery 21 when needed. In other words, when the bypass switch 35 of a bypass branch 34 is open, the corresponding cell 33 is crossed by the electrical current which crosses the battery 21; instead, when the bypass switch 35 of a bypass branch 34 is closed, the corresponding cell 33 is not crossed by the electrical current which crosses the battery 21 because such a current flows through the bypass branch 34. The diode 36 of the bypass branch 34 is used to avoid short-circuiting the cell 33 when the bypass switch 35 is closed.

Furthermore, at least one sensor 38 is provided for each cell 33 which is coupled to the cell 33 to detect in use the state of the charge of the cell 33 itself. According to an embodiment shown in the accompanying figures, each sensor 37 is a voltmeter, is coupled in parallel to the corresponding cell 33, and measures the voltage present at the terminals of the cells 33 itself; the charge state of the cell 33 itself can be accurately determined according to the voltage present at the terminal of a cell 33 and by applying a law which can be obtained experimentally. According to a possible variant, a temperature sensor which determines the temperature of the cell 33 is also provided; the measurement of a temperature of a cell 33 is used along with the measurement of the voltage present at the terminals of the cell 33 to determine the charge state of the cell 33 itself.

An embodiment of a method used for supplying electrical energy to the section of auxiliaries 18 by means of a particular control type of the connector switches 24 and 25 is described below.

By appropriately driving the bypass switches 35 of the bypass branches 34 of the batteries 21 it is possible to vary the voltage present at the terminals of the batteries 21 and, thus, the voltage present at the terminals of the storage system 14. In particular, in a battery 21 when all the bypass switches 35 of the bypass branches 34 are open, the twenty-five cells 33 of the battery 21 are coupled in series, and thus the voltage at the terminals of the battery 21 is equal to 100 Volts nominal (each cell 33 has a nominal voltage of 4 Volts, 4×25=100 Volts); instead, in battery 21 when only three bypass switches 35 of the bypass branches 34 are open (i.e. the other twenty-two bypass switches 35 are closed), only three cells 33 of the battery 21 are coupled in series, and thus the voltage at the terminals of the battery 21 is equal to 12 Volts nominal (each cell 33 has a nominal voltage of 4 Volts, 4×3=12 Volts). Thus, by varying the number of open and closed bypass switches 35, it is possible to vary the voltage present at the terminals of the storage system 14: when the storage section 16 is coupled to the section of traction 17, all the bypass switches 35 of the bypass branches 34 are open to have at the terminals of the storage system 14 a voltage equal to 200 Volts nominal, instead when the storage section 16 is coupled to the section of auxiliaries 18 only three (or four) bypass switches 35 of the bypass branches 34 are open to have at the terminals of the storage system 14 a voltage equal to 12 Volts (or 16 Volts) nominal (a nominal voltage also slightly higher than 12 Volts may be applied to the buffer battery 20 for recharging the buffer battery 20 itself).

The connector switches 24 and 25 may be both open (typically in case of maintenance), but are never both closed, because the input voltage of the section of traction 17 (200 Volts nominal) is highly different from the input voltage of the section of auxiliaries 18 (12 Volts nominal); in other words, by closing both connector switches 24 and 25, it is impossible to supply the corresponding nominal voltages to both sections 17 and 18, thus by closing both connector switches 24 and 25 of the section of traction 17 a greatly insufficient voltage is applied to the section of traction and/or an excessively high voltage is applied to the section of auxiliaries 18.

There may be three different situations in use: the storage section 16 is coupled only to the section of traction 17 to exchange electrical energy with the section of traction 17, the storage section 16 is coupled only to the section of auxiliaries 18 for providing electrical energy to the section of auxiliaries 18, or the storage section 16 is coupled at the same time to the section of traction 17 and to the section of auxiliaries 18.

It is apparent that when the storage section 16 is coupled only to the section of traction 17 the connector switch 24 is closed and the connector switch 25 is opened. Similarly, when the storage section 16 is coupled only to the section of auxiliaries 18 the connector switch 24 is opened and the connector switch 25 is closed.

More complicated is the situation in which the storage section 16 is coupled at the same time both to the section of traction 17 and to the section of auxiliaries 18; this situation is managed by means of time sharing, i.e. intervals of time A in which the storage section 16 is coupled to the section of traction 17 are cyclically alternated with intervals of time B in which the storage section 16 is coupled to the section of auxiliaries 18. In other words, for a time interval A, the storage section 16 is coupled to the section of traction 17, at the end of the time interval A the storage section 16 is coupled to the section of auxiliaries 18 for a time interval B, at the end of the time interval B the storage section 16 is coupled to the section of traction 17 for a new time interval A, and so on. Clearly, when the connector switches 24 and 25 are driven to vary the section 17 or 18 coupled to the storage section 16 the bypass switches 35 of the bypass branches 34 are correspondingly driven to always apply the correct voltages to the sections 17 and 18.

When the section of traction 17 is uncoupled from the storage section 16, the power electronic converter capacitors 13 are capable of compensating for the lack of coupling to the storage section 16 by supplying or absorbing electrical energy. When the storage section 18 is uncoupled from the storage section 16, the buffer battery 20 is capable of compensating for the lack of coupling with the storage section 16 by supplying electrical energy.

The duration of the time intervals A and B is not normally constant and predetermined, but is determined from time to time according to the operating conditions by taking into account, on one hand, the electrical energy exchanging needs of sections 17 and 18 with storage section 16 and, on the other hand, the capacity of sections 17 and 18 to work well in the absence of the coupling with the storage section 16. For example, when the buffer battery 20 is very flat, the duration of the time intervals B is extended, or when the electric machine 8 is close to full power then the duration of time intervals A is extended. It is apparent that the most critical condition occurs when at the same time the buffer battery 20 is very flat and the electric machine 8 is close to full power; this critical condition may be avoided with a smart recharging management of the buffer battery 20 and may be managed by temporarily uncoupling the non indispensable auxiliary services 19 (such as air conditioning) and/or temporarily limiting the power of the electric machine 8.

By way of example, the average duration of the time intervals A and B is approximately 0.5 to 2 seconds.

The cells 33 including each battery 21 inevitably display differences related to constructive tolerances and to the dispersion of the components used for making the cells 33 themselves; consequently, the capacity (i.e. the amount of electrical charge which may be delivered and commonly expressed in Ampere-hour) of the cells 33 has significant differences which in the currently marketed batteries are of the order of ±10% with respect to nominal value. Being the cells 33 coupled to one another in series, the capacity of each battery 21 (i.e. the series of all the cells 33) is always limited to the lower capacity present (i.e. to the lowest capacity of all the cells 33); thus only the less performing cell 33 is used for the maximum of its performance, while all the other cells 33 are under-used. In a battery 21 including twenty-five cells 33 coupled in series, this means that only one cell 33 is used to the maximum of its performance, while the other twenty-four cells 33 are more or less under-used.

In order to be able to exploit all the cells 33 of each battery 21 to the maximum of their performance, it is possible to use only the most charged cells 33 (i.e. the cells 33 which have a greater charge capacity) which are cyclically alternated to power the section of auxiliaries 18. In other words, when the section of auxiliaries 18 is powered, only few cells 33 are used at the same time (i.e. only three of four cells 33), and such cells 33 to be used to power the section of auxiliaries 18 are chosen among the most charged cells 33 (i.e. the cells 33 which have a higher charge capacity). In this manner, an equalization of the charge state of the cells 33 is carried out because part of the charge present in the most charged cells 33 (i.e. the cells 33 which have the highest charge capacity) is drained to power the section of auxiliaries 18. The cells 33 used for powering the section of auxiliaries 18 are continuously varied to use the most charged cells 33 each time.

In other words, in use, the charge state of each cell 33 is detected by means of the respective sensor 37 coupled to the cell 33 itself; typically, the charge state of a cell 33 is expressed as quantity of charge stored in the cell 33, and such a quantity of charge may be absolute (i.e. measured for example in Ampere-hour) or relative (for example expressed as a percentage with respect to the amount of maximum or nominal charge). By comparing the charge states of the cells 33 it is determined which cells 33 have the highest charge state (i.e. the most charged cells 33) and thus which cells 33 are to be used to power the section of auxiliaries 18.

According to an embodiment, a safety voltmeter 38 which measures the electrical voltage upstream of the connector switch 25 and enables the closing of the connector switch 25 only if the electrical voltage upstream of the connector switch 25 is compatible with the nominal electrical voltage of the section of auxiliaries 18 is arranged upstream of the connector switch 25. Furthermore, the safety voltmeter 38 determines the immediate opening of the connector switch 25 if the electrical voltage upstream of the connector switch 25 exceeds the maximum electrical voltage sustainable by the section of auxiliaries 18. The function of the safety voltmeter 38 is to offer a further safety to avoid applying an electrical voltage higher than the maximum sustainable electric voltage the section of auxiliaries 18.

According to a different embodiment, the two batteries 21 are coupled in series to output the voltage of 200 Volts nominal when the storage section 16 exchanges energy with the section of traction 17; instead, when the storage section 16 feeds the section of auxiliaries 18 the two batteries 21 are coupled in parallel so as to be able to use six cells 33 (instead of three cells 33) to output the voltage of 12 Volts nominal. In this manner, it is possible to feed double the electrical power from the storage section 16 to the section of auxiliaries 18. In order to couple the two batteries 21 either in series or in parallel, the storage system 14 includes one or more series/parallel electronic or electromechanical switches, which are driven to vary the type of coupling of the two batteries 21.

An embodiment of the electrical system 15 described above may have many advantages.

Firstly, the electrical system 15 described above allows to supply a suitable electrical supply to the section of auxiliaries 18 without using a dedicated electronic converter with an evident saving of costs and, above all, of dimensions and weight.

Furthermore, the electrical system 15 described above allows to equalize the charge between the cells 33 of each battery 21 without using a dedicated electrical energy management unit (also called equalization unit) which during the operation of the battery 21 has the task of transferring electrical energy between cells 33; in other words, the equalization of the charge of the cells 33 of each battery 21 is not implemented by transferring electrical energy from the most charged cells 33 to the least charged cells 33, but by transferring the electrical energy from the most charged cells 33 to the section of auxiliaries 18. In this manner, the energy efficiency of the batteries 21 is increased (the energy transfer in the cells 33 causes a given dissipation of energy) and the cost of the control unit of the electrical energy is saved.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An electrical system of a vehicle with electric propulsion achieved by at least one electrical machine; the electrical system comprising:
    a storage section including at least one battery having a first nominal voltage and further including a plurality of cells coupled in series wherein each cell in the plurality of cells is further coupled in parallel to a respective bypass branch and coupled in parallel to respective bypass switch;
    a section of traction that interacts with the electric machine configured to operate at said first nominal voltage, and is the section of traction equipped with a power electronic converter configured to exchange electrical energy with the storage section;
    a section of auxiliaries configured to operate at a second nominal voltage lower than said first nominal voltage, the section of auxiliaries configured to provide power to auxiliary services of the vehicle requiring an electric supply, the section of auxiliaries including a buffer battery, and the section of auxiliaries electrically powered by the storage section;
    a first connector switch coupling the storage section to the section of traction;
    a second connector switch coupled in parallel to the first connector switch and coupling the storage section traction also to the section of auxiliaries; and
    a control unit configured to close the first connector switch, open the second connector switch, and open all the bypass switches such that the battery exhibits the first nominal voltage in order to achieve an exchange of energy between the storage section and the section of traction closes, and configured to open the first connector switch, close the second connector switch, and open a limited number of bypass switches such that the at least one battery exhibits a voltage lower than the first nominal voltage and approximately equal to the second nominal voltage of the section of auxiliaries in order to transfer electrical energy from the storage section to the section of auxiliaries.

2. The electrical system according to claim 1, wherein in order to transfer electrical energy from the storage section to the section of auxiliaries the control unit opens a number of bypass switches roughly equal to the second nominal voltage of the section of auxiliaries divided by a nominal voltage of each cell.

3. The electrical system according to claim 1, wherein the section of auxiliaries is directly connected to the storage section without the interposition of a power electronic converter adapted to reduce the electrical voltage.

4. The electrical system according to claim 1 and comprising a security voltmeter that measures the voltage upstream of the second connector switch, gives the consent to the closure of the second connector switch only if the voltage upstream of the second connector switch is compatible with the second nominal electrical voltage of the section of auxiliaries, and determines the opening of the second connector switch if the voltage upstream of the second connector switch exceeds the maximum voltage tolerable by the section of auxiliaries.

5. The electrical system according to claim 1 wherein the battery comprises for each cell at least one sensor which is coupled to the cell to detect, in use, the charge status of the cell itself; in order to transfer electrical energy from the storage section to the section of auxiliaries the control unit determines the cells with the highest charge and opens the bypass switches of the cells with the highest charge.

6. The electrical system according to claim 1, wherein, when the storage section must be simultaneously coupled to both the section of traction, and the section of auxiliaries, the control unit alternates cyclically the first time intervals during which the storage section is coupled to the section of traction and the second time intervals during which the storage section is coupled to the section of auxiliaries.

7. The electrical system according to claim 6, wherein the section of traction is provided with capacitors to compensate for the lack of coupling with the storage section by providing or absorbing electrical energy during the second time intervals during which the section of traction is uncoupled from the storage section.

8. The electrical system according to claim 6, wherein the buffer battery of the section of auxiliaries compensates for the lack of coupling with the storage section by providing electrical energy during the first time intervals.

9. The electrical system according to claim 6, wherein the duration of the time intervals is determined from time to time taking into account, on one hand the needs of exchanging electrical energy of the sections of traction and of auxiliaries with the storage section and on the other hand the capacity of the sections of traction and of auxiliaries to work well in the absence of the coupling with the storage section.

10. A control method of an electrical system of a vehicle with electric propulsion achieved by at least one electrical machine; the electrical system comprising:
a storage section including at least one batter having a first nominal voltage and further including a plurality of cells coupled in series wherein each cell in the plurality of cells is further coupled in parallel to a respective bypass branch and coupled in parallel to a respective bypass switch;
a section of traction that interacts with the electric machine configured to operate at said first nominal voltage, the section of traction equipped with a power electronic converter configured to exchange electrical energy with the storage section;
a section of auxiliaries configured to operate at a second nominal voltage lower than said first nominal voltage, the section of auxiliaries configured to provide power to auxiliary services of the vehicle requiring an electric supply, the section of auxiliaries including a buffer battery, and the section of auxiliaries electrically powered by the storage section;
a first connector switch coupling the storage section to the section of traction;
a second connector switch coupled in parallel to the first connector switch and coupling the storage section to the section of auxiliaries; and
a control unit configured to close the first connector switch, open the second connector switch, and open all the bypass switches such that the battery exhibits the first nominal voltage in order to achieve an exchange of energy between the storage section and the section of traction closes, and configured to open the first connector switch, close the second connector switch, and open a limited number of bypass switches such that the at least one battery exhibits a voltage lower than the first nominal voltage approximately equal to the second nominal voltage of the section of auxiliaries in order to transfer electrical energy from the storage section to the section of auxiliaries.

* * * * *

UNITED STATES PATENT AND TRADEMARK OFFICE
CERTIFICATE OF CORRECTION

PATENT NO. : 9,006,920 B2  
APPLICATION NO. : 13/081697  
DATED : April 14, 2015  
INVENTOR(S) : Fabrizio Favaretto and Giovanni Stefani Page 1 of 1

It is certified that error appears in the above-identified patent and that said Letters Patent is hereby corrected as shown below:

In the claims,

In Claim 1, Column 8, line 41 of the patent, please delete the text "and is"

In Claim 1, Column 8, line 55 through 56 of the patent, please delete the text "traction also"

Signed and Sealed this
Sixth Day of October, 2015

Michelle K. Lee
*Director of the United States Patent and Trademark Office*